United States Patent [19]

Tick

[11] Patent Number: 4,668,641
[45] Date of Patent: May 26, 1987

[54] OPTICAL ELEMENTS MADE FROM THF$_4$—BEF$_2$ GLASSES

[75] Inventor: Paul A. Tick, Corning, N.Y.
[73] Assignee: Corning Glass Works, Corning, N.Y.
[21] Appl. No.: 827,543
[22] Filed: Feb. 10, 1986

Related U.S. Application Data

[63] Continuation-in-part of Ser. No. 674,411, Nov. 23, 1984, abandoned.

[51] Int. Cl.$^4$ .................. C03C 13/04; C03C 3/32; C03C 4/08; C03C 4/10
[52] U.S. Cl. .................. 501/37; 501/40; 501/904; 501/905; 501/906
[58] Field of Search .................. 501/40, 904, 905, 906, 501/37

[56] References Cited

U.S. PATENT DOCUMENTS

| | | | |
|---|---|---|---|
| 2,466,507 | 4/1949 | Sun | 501/40 |
| 2,511,224 | 6/1950 | Sun et al. | 501/40 |
| 3,650,779 | 3/1972 | Riebling et al. | 501/40 |
| 3,958,970 | 5/1976 | Auzel | 501/43 |
| 4,141,741 | 2/1979 | Lucas et al. | 501/40 |
| 4,142,986 | 3/1979 | Rapp | 501/44 |

FOREIGN PATENT DOCUMENTS 2445820 9/1980 France .

OTHER PUBLICATIONS

Thoma, R. E., et al; "Phase Equilibria in the System BeF$_2$—ThF$_4$ and LiF—BeF$_2$—ThF$_4$", J. Phys. Chem., vol. 64, pp. 865–870, Jul. 1960.

*Primary Examiner*—Mark L. Bell
*Attorney, Agent, or Firm*—K. van der Sterre

[57] ABSTRACT

ThF$_4$—BeF$_2$ glasses of specified composition exhibit sufficiently low high-temperature viscosity and melt stability to be useful for the fabrication of optical devices for ultraviolet or infrared light transmission. The low melt viscosity renders the glasses suitable as host materials for rare earth and transition metal dopants so that they can be used for optical devices such as lasers and optical filters.

5 Claims, 4 Drawing Figures

OPTICAL ELEMENTS MADE FROM $ThF_4$—$BeF_2$ GLASSES

The Government has rights in this invention pursuant to Contract No. N00014-82-C-2314 awarded by the Department of the Navy.

This application is a continuation-in-part of copending application Ser. No. 06/674,411, filed Nov. 23, 1984 and now abandoned.

BACKGROUND OF THE INVENTION

The present invention relates to glass compositions based on $BeF_2$ and particularly to $ThF_4$—$BeF_2$ glasses exhibiting improved melting properties and an extended melting range, rendering them particularly suitable for infrared or u.v.-transmitting optical devices.

In recent years there has been considerable interest in fluoroberyllate glasses, primarily for applications in laser technology. Very low refractive index, dispersion power, and non-linear coefficients of refractive index are among the properties that are unique to this family of glasses. In addition, fluoroberyllate glasses possess better ultraviolet transmission than fused silica and are good hosts for fluorescing elements such as the rare earths. The primary drawbacks to these glasses are the toxicity of beryllium and the poor water durability of $BeF_2$-based compositions.

Besides laser applications, the low dispersion characteristics and long range infrared transparency of these glasses make them good candidates for ultra-low-loss optical waveguides. In a cladded optical waveguide structure the importance of core durability is minimal if the cladding can be formed of a durable glass.

Many possible variations of $BeF_2$ compositions appear in the literature, but nearly all of these require relatively large amounts of a second or third component to achieve the necessary softening of the glass. Rawson, "Inorganic Glass-Forming Systems", Academic, New York (1967) pages 236–247, provides a good background description of the known $BeF_2$ glass-forming systems, while U.S. Pat. No. 3,650,779 describes alkali-fluoroberyllate glass used as a host matrix for xenon.

In U.S. Pat. No. 3,958,970, $MgF_2$—$PbF_2$—$BeF_2$ glasses are used to make fluorescing materials via additions of ytterbium fluoride, erbium fluoride and thulium fluoride. U.S. Pat. No. 4,142,986 discloses NaF—$AlF_3$—$BeF_2$ glasses containing $NaPO_3$ and doped with $NdF_3$ to provide an infrared laser glass, while similarly doped glasses based in the $BeF_2$—$AlF_3$ composition system are described in published French application No. 2,445,820.

The list of additives to $BeF_2$-based glasses has included, in addition to the modifying alkali and alkaline earth metal fluorides, lanthanide series elements, cerium, and thorium. U.S. Pat. Nos. 2,466,507 and 2,511,224 disclose complex optical glasses of this type.

As noted by Rawson, supra, $BeF_2$ forms a glass by itself and has a structure which is analogous to fused silica. However, the melting characteristics of pure $BeF_2$ are not well suited to the preparation of homogeneous glasses containing minor additions of modifying constituents, because of the high viscosity and short working range of $BeF_2$ glass. In order to effectively mix $BeF_2$ melts, particularly crucible melts, viscosities below 100 poises are needed. To achieve these viscosities in pure $BeF_2$ melts ordinarily requires heating to temperatures above 970° C., and at these temperatures the vapor pressure of $BeF_2$ becomes appreciable. It is this characteristic which has necessitated the development of the complex $BeF_2$-containing glass compositions known in the prior art.

Phase equilibrium studies of the systems $BeF_2$—$ThF_4$ and LiF—$BeF_2$—$ThF_4$ are reported by R. E. Thoma et al. in J. Phys. Chem., 64 (July 1960) 865–870. However, Thoma et al. characterized the $BeF_2$ melts as high in viscosity. No information is provided as to the clarity of the melts prepared for the study, nor as to any of the other material properties of the system.

In any glass composition field, it is advantageous to be able to obtain desired property modifications with as small a composition excursion as possible. In $BeF_2$ glasses, small additions of alkali can be tolerated without destroying clarity; however, other additions such as $PbF_2$ have a strong destabilizing effect and do not produce useful glasses. Both systems have been described by D. M. Ray et al., J. Am. Cer. Soc., 37(7) 300–305 (1954).

This consideration is particularly critical for optical applications such as optical fibers wherein substantial modification of optical constants such as refractive index must be achieved with very small quantities of additives, in order to avoid large shifts in physical properties and, most importantly, phase separation of any kind. Optical fibers provide extremely large optical path lengths wherein even the slightest crystallization or phase separation destroys utility.

A principal object of the present invention is to simplify the production of optical devices comprising $BeF_2$-based glasses through the use of glass compositions of improved stability and reduced viscosity.

It is a further object of the invention to adapt $BeF_2$-based glass compositions comprising only simple additions of a single viscosity-modifying constituent to the fabrication of $BeF_2$ glass optical devices.

Other objects and advantages of the invention will become apparent from the following description.

SUMMARY OF THE INVENTION

The present invention comprises the manufacture of glass optical devices from $ThF_4$—$BeF_2$ glass compositions. These compositions have been found to demonstrate excellent glass melting behavior, and can therefore can be used to produce clear $ThF_4$—$BeF_2$ glass articles of good quality by casting, drawing or other conventional glass-forming techniques. Compositions according to the invention consist essentially, in mole percent, of about 3–30% $ThF_4$ and 70–97% $BeF_2$. Within this composition range clear, water-white glasses are typically formed, while compositions containing more than 30 mole percent $ThF_4$ exhibit slight to moderate phase separation and/or devitrification, and can exhibit varying degrees of haze or translucence depending upon composition and the forming process which is used.

In addition to providing high quality base glasses, the $ThF_4$—$BeF_2$ compositions are generally compatible with additives such as the transition metal and rare earth elements. Thus while the pure $ThF_4$—$BeF_2$ glasses may be used for optical fiber elements or elemets for u.v. or infrared light transmission, glasses doped with additional elements are useful for applications wherein active or passive optical components such as optical filters, glass luminescent or fluorescent elements, or laser glasses elements are needed. Examples of elements which can be included in these glasses include any of the rare earth or Lanthanide Series elements of the period Table (atomic numbers 58-71), including for example Ce, Sm, Er, Tb, Pr, Gd and Dy. Transition metal additives may include elements of atomic numbers 21-30, such as iron and copper.

DESCRIPTION OF THE DRAWINGS

The invention may be further understood by reference to the drawings, wherein.

DETAILED DESCRIPTION

Figure 1:
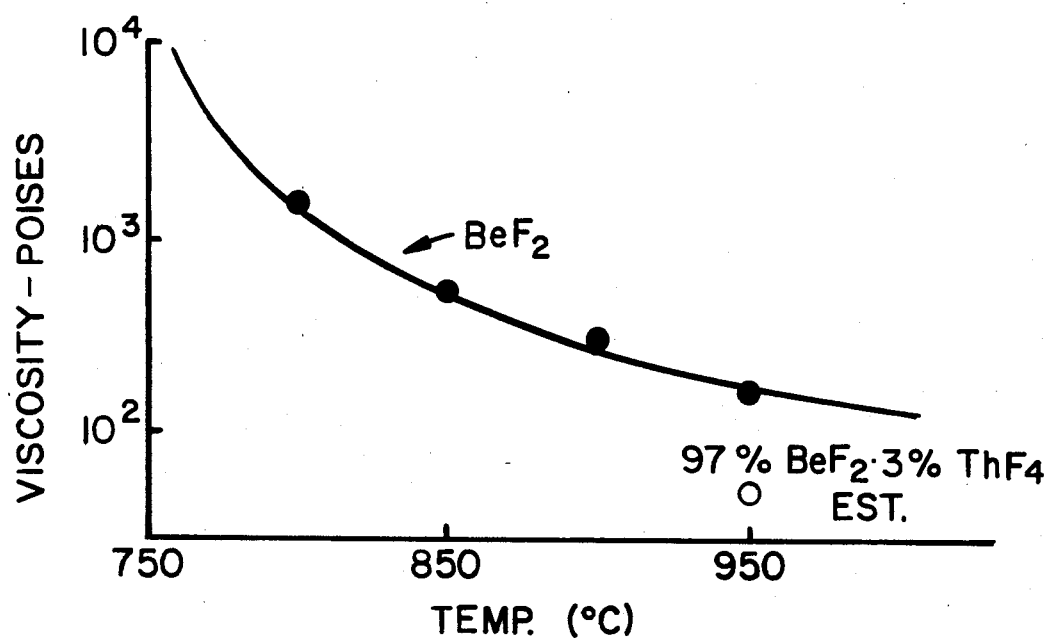
FIG. 1 is a plot of glass viscosity as a function of temperature for a $BeF_2$ glass; also shown is an estimated viscosity for a representative $ThF_4$—$BeF_2$ glass melt.

Because of the toxicity of beryllium and the fact that $BeF_2$ glasses tend to be hygroscopic, an enclosed melting facility for preparing $ThF_4$—$BeF_2$ glasses is desirable. A suitable apparatus for preparing glasses according to the invention is an atmospherically controlled glove box melter wherein crucible melts may be prepared and the resulting glasses handled and stored in a dry, inert environment.

Batches for the glasses may be compounded from fluorides or other compounds of the cationic constituents in proportions which will yield the desired glass compositions at the temperature utilized for melting the batch. The preferred beryllium-containing batch material is ammonium beryllium fluoride, $(NH_4)_2BeF_4$, while $ThF_4$ may be used as the thorium batch ingredient. Rare earth and transition metal additives, if included, may also be introduced as fluorides. For additives introduced in small proportions chlorides or other halides may be used; the presence of minor amounts of chloride does not adversely affect glass quality.

Glass batches compounded according to the invention may be readily melted at temperatures of about 900°-1000° C. Melt viscosities at 950° C. are suitable for homogenizing the melt by swirling or stirring, and glass articles may be formed from the melt by drawing, rolling, casting or any other conventional method. The melts are typically of good quality, and clear, water-white glass articles can easily be formed by casting.

Table I below reports glass compositions useful for making optical devices within the scope of the invention, together with a comparative $BeF_2$ glass. Included in Table I are compositions for each glass, in mole percent as calculated from the batch, and batch compositions in parts by weight. Also included in Table I are indications of the characteristics of the melt, whether fluid or viscous, and the characteristics of glass patties formed by slow cooling from the melt at thickness of 5-8 mm.

Batches for the glasses reported in Table I were compounded using $ThF_4$ of 99.9% purity and $(NH_4)_2 BeF_2$ of 99% purity, the latter being commercially obtainable from Atomergic Chemetals Corp. of Plainview, N.Y. The batches were hand-mixed, and the mixed batches were then melted in vitreous carbon crucibles under a dry nitrogen atmosphere in a platinum-wound electric furnace operating at 950° C. The melts were hand-stirred once during melting.

After melting, the crucibles were removed from the furnace and the glass was allowed to cool in the crucibles to room temperature, after which the glass samples were easily removed. The glasses were ground and polished under kerosene, and were stored under kerosene to avoid moisture pick-up when not in use.

TABLE I

| Glass and Batch Compositions | 1 | 2 | 3 | 4 | 5 | 6 | 7 |
|---|---|---|---|---|---|---|---|
| Glass Composition | | | | | | | |
| $BeF_2$ | 95 | 97 | 90 | 80 | 70 | 60 | 100 |
| $ThF_4$ | 5 | 3 | 10 | 20 | 30 | 40 | — |
| Batch Composition | | | | | | | |
| $(NH_4)_2BeF_4$ | 23.0 | 23.5 | 21.8 | 19.3 | 4.2 | 3.60 | 25.00 |
| $ThF_4$ | 3.1 | 1.9 | 6.2 | 12.3 | 4.6 | 6.10 | — |
| Properties | | | | | | | |
| Melt | Fluid | Fluid | Fluid | Fluid | Fluid | Fluid | Viscous |
| Glass Quality | Clear | Clear | Clear | Slight Haze | Hazy | Slight Devit. | Clear |

While the pure $BeF_2$ glass produced in accordance with the above procedure (Example 7) was quite viscous, as little as 3 mole percent added $ThF_4$ (Example 2) reduced the viscosity of the melt such that effective mixing and casting were easily accomplished. FIG. 1 of the drawing is a viscosity temperature curve for a pure $BeF_2$ glass such as Example 7 showing a viscosity at 950° C. of about 150 poises. In contrast, the estimated 950° C. viscosity for the 3% $ThF_4$-97% $BeF_2$ glass of Table I, also shown in FIG. 1, is less than 50 poises.

No phase separation or $ThF_4$ loss from these melts was observed at $ThF_4$ concentrations up to 10 mole percent. Some $ThF_4$ volatilization occured at concentrations above 10 mole percent, some phase separation was observed at $ThF_4$ concentrations above 12 mole percent. However, good quality clear-to-slightly opal glasses are obtainable at $ThF_4$ concentrations (batched) about 30 mole percent, and up to 40 mole percent $ThF_4$ if rapid-quench forming techniques such as rolling, rather than slow-cooling forming methods, are used.

Figure 2:
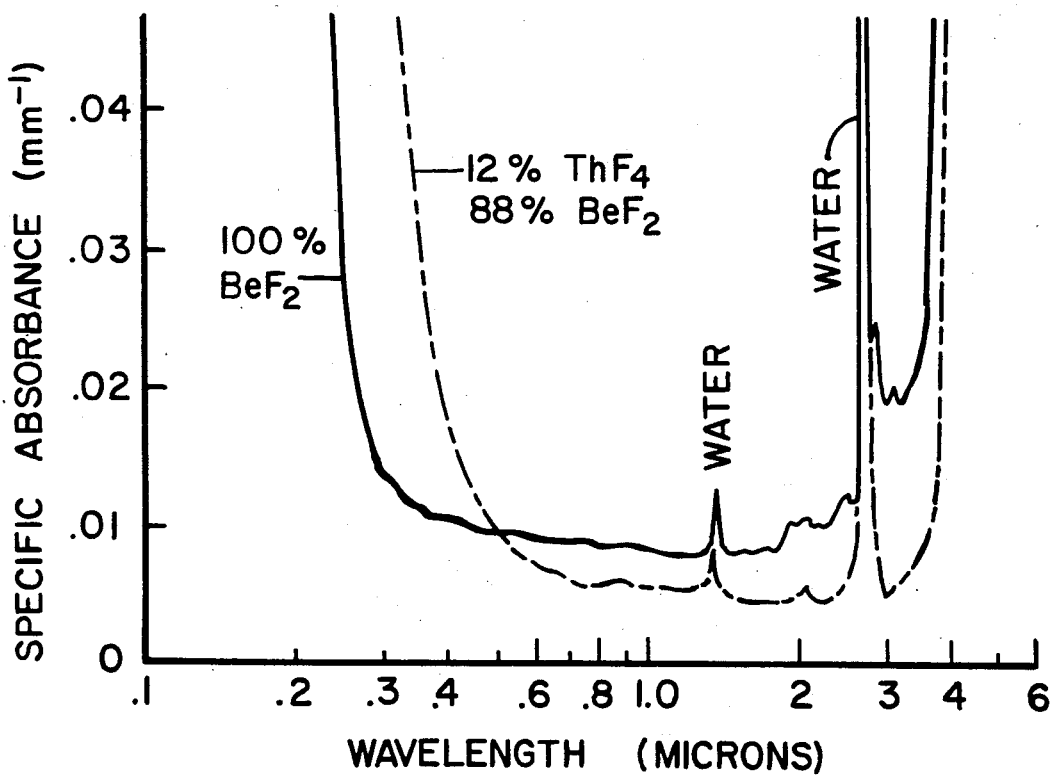
FIG. 2 includes specific absorbance plots of a $BeF_2$ glass and of a $ThF_4$—$BeF_2$ glass of the invention.

In addition to improving the melting characteristics of the glass, $ThF_4$ additions appear to improve somewhat the water durability of the glass, to shift the ultraviolet absorption edge of the glass to somewhat longer wavelengths, and to shift the infrared absorption edge to somewhat longer wavelengths. FIG. 2 of the drawing sets forth composite specific absorbance plots for a $BeF_2$ glass and for a $ThF_4$—$BeF_2$ glass containing 12 mole percent $ThF_4$ wherein these spectral effects are shown.

Referring to FIG. 2, the infrared spectrum from 2.5–5 microns (measured with a Perkin-Elmer Model 681 infrared spectrophotometer) shows a strong absorption peak at 2.7 microns attributed to the presence of OH groups in the glass. The presence of OH is also known to effect the position of the ultraviolet absorption edge of $BeF_2$-based glasses. Hence in the spectral region between 0.25 and 2.5 microns (measured with a Cary Model 17 spectrophotometer) wherein another OH peak is observed at 1.4 microns, the ultraviolet absorption edges of both glasses are positioned at longer wavelengths than would be found in OH-free glasses of the same fluoride composition. The decrease in absorbance for the $ThF_4$—$BeF_2$ glass in the visible to near-infrared spectral region is attributed to improved glass surface quality, rather than to any real improvement in glass transmission.

Figure 3:
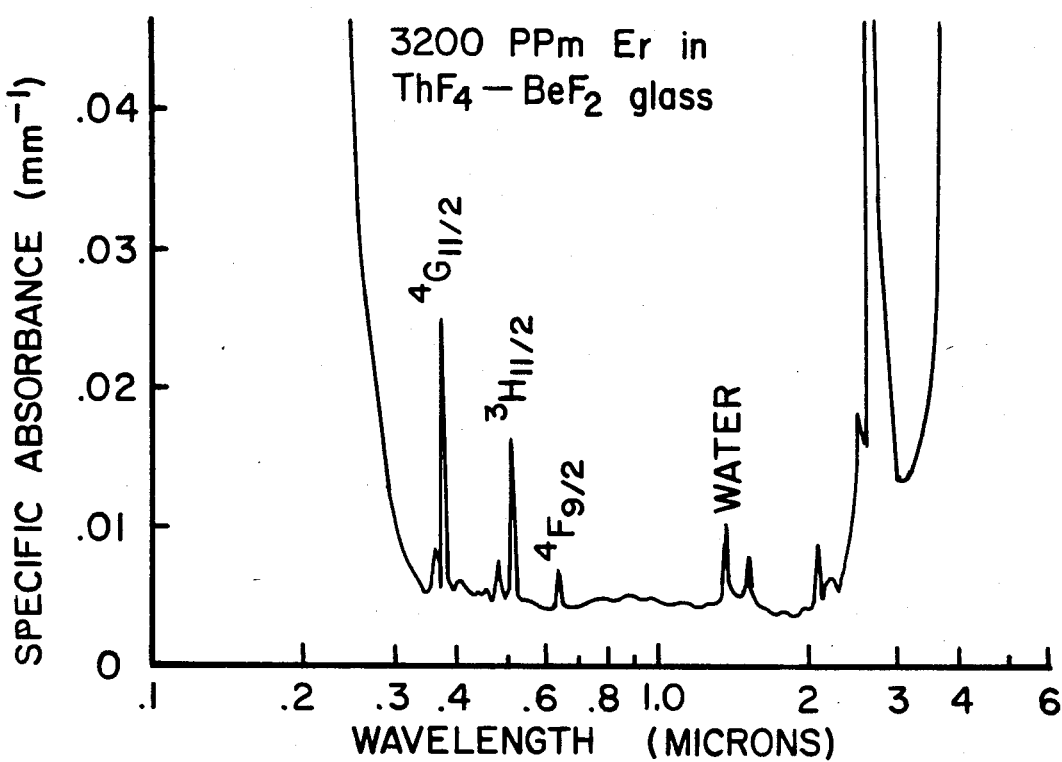
FIG. 3 is a specific absorbance plot of a $ThF_4$—$BeF_2$ glass doped with erbium.

Due to the reduced viscosity of the melts, the homogeneous inclusion of minor amounts of rare earth or transition metal dopants in these $ThF_4$—$BeF_2$ glasses can be easily accomplished, and these additions impart clear characteristic spectral absorption features to the doped glasses. FIG. 3 of the drawing sets forth a specific absorbance plot for a $ThF_4$—$BeF_2$ glass containing 3200 ppm by weight of erbium as a dopant. The base glass had the composition of Example 2 in Table I above, including 3 mole percent $ThF_4$; the Er dopant was introduced to the glass batch as pure $ErF_3$. The absorption spectrum of this glass, including well-defined absorption peaks characteristic of the particular rare earth dopant selected, is representative of the types of absorption behavior exhibited by rare earth-doped $ThF_4$—$BeF_2$ glasses of the invention.

The same base glass (97% $BeF_2$—3% $ThF_4$) was doped with a number of other rare earth elements to evaluate the characteristics of these glasses as suitable host materials. Table II below reports optical absorption data for six rare earth dopants at selected wavelengths where relatively strong characteristic absorption peaks appeared in the absorption spectra of the doped glasses. Included in Table II for each dopant are the doping concentration level, in weight percent, the wavelengths (nm) of the absorption peaks measured, the energy transition giving rise to each peak, and the absorption coefficient at the peak wavelength due to the presence of the dopant in the specified concentration.

TABLE II

| | Optical Absorption in Doped $ThF_4$ - $BeF_2$ Glass | | | |
|---|---|---|---|---|
| Dopant | Doping Level (% Wt.) | Absorption Peak (nm) | Electron Transition | Absorption Coeff. ($cm^{-1}$) |
| Dysprosium | 0.39 | 348 | $^4G_{11/12}$ | 0.1105 |
| | | 1070 | $^{9/2}H_{7/2}$ | 0.0829 |
| | | 1265 | $^{11/12}H_{9/2}$ | 0.2648 |
| Gadolinium | 0.18 | 272 | $^6I_{13/2}$ | 0.023 |
| | | 275 | $^6I_{11/12}$ | 0.033 |
| Samarium | 0.27 | 397 | $4K_{11/12}$ | 0.1221 |
| | | 1070 | $^{9/2}H_{15/2}$ | 0.1382 |
| | | 1270 | $^{7/2}H_{15/2}$ | 0.1681 |
| Erbium | 0.32 | 376 | $^4G_{11/12}$ | 0.4353 |
| | | 517 | $^3H_{11/12}$ | 0.2764 |
| | | 647 | $^4F_{9/2}$ | 0.0668 |
| Terbium | 0.435 | 269 | $^3D_2$ | 0.0921 |
| | | 1910 | $^7F_{11/12}$ | 0.0852 |
| Praseodymium | 0.214 | 438 | $^3P_2$ | 0.1819 |
| | | 1515 | $^3F_4$ | 0.1382 |

For all of the above dopants, absorption data similar to that reported above was used to establish that Beer's Law is obeyed in these glasses, ie., a linear dependance between absorption and the concentration of the absorber is observed. A cerium dopant was also tried but, unlike the above dopants, it did not produce strong absorption peaks in these glasses. However, both the infrared and the ultraviolet absorption peaks were shifted to longer wavelengths in the cerium-doped glass.

Transition metal doping of these glasses suggests that $BeF_2$ creates a strongly reducing environment. Additions of copper (II) chloride ($CuCl_2$) produces broad absorption at 700 nm, attributed to divalent Cu; chemical analysis indicates the Cl is preferentially volatilized from the melt. However, the intensity of the 700 nm absorption peak is nearly independent of copper concentration over the range from 0.1–0.36% by weight, suggesting that most of the copper is reduced to the monovalent state.

Figure 4:
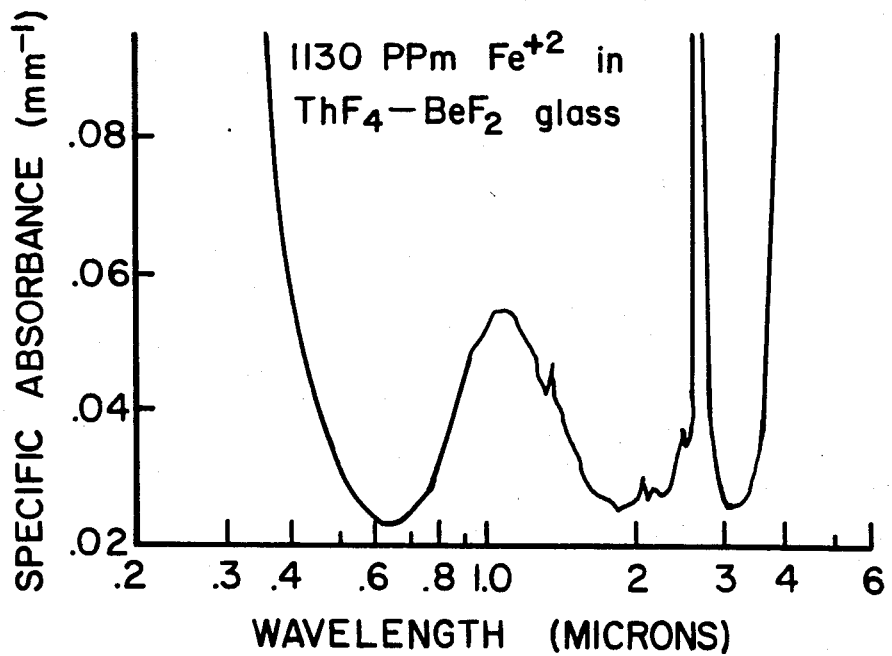
FIG. 4 is a specific absorbance plot of a $ThF_4$—$BeF_2$ glass doped with iron.

Similarly, iron dopants in these glasses produce an absorption characteristic of $Fe^{+2}$ regardless of whether ferrous iron or ferric iron is introduced. FIG. 4 of the drawing is a specific absorbance plot for a glass having the composition of Example 2 of Table I, containing 97 mole percent $BeF_2$ and 3 mole percent $ThF_4$, to which was added 1130 ppm (weight) of iron as $FeF_3$. The broad absorption peak centered at 1080 nm is attributed to $Fe^{+2}$ absorption, and the absorption of iron follows Beer's law.

From the foregoing it is concluded that $ThF_4$—$BeF_2$ glasses provide a suitable host material not only for rare earth dopants, but also for transition metal dopants. In either case, utilizing a preferred range of base glass compositions consisting essentially, in mole percent, of 3–12% $ThF_4$ and 88–97% $BeF_2$, the homogeneous addition of up to 1% by weight total of rare earth and/or transition metal dopants can easily be accomplished for optical device applications requiring such dopants.

While other binary systems such as $PbF_2$—$BeF_2$ and $BaF_2$—$BeF_2$ encompass low-melting eutectics as does the $ThF_4$—$BeF_2$ system, such eutectics do not guarantee good glass forming behavior. To the contrary, additions of $ThF_4$ appear uniquely effective to modify the high temperature viscosity of $BeF_2$ melts without destabilizing the composition or promoting the development of phase separation or crystallization. This behavior is in marked contrast to other common fluoride modifiers which have been used in $BeF_2$-based glasses. Table III below reports data resulting from glass melting studies concerning the effects of various known modifiers on melt viscosity and melt and glass quality in $BeF_2$-based glasses. Included in Table III for each of a number of glass melts are the composition of each melt, in mole percent, the appearance of the melt at 950° C., and the optical quality of glass patties formed by casting and cooling the melts.

TABLE III

| Modified $BeF_2$ Glass Melts | | |
|---|---|---|
| Melt Composition (mole %) | Melt Appearance | Glass Quality |
| $BeF_2$ | very stiff, grey | grey glass, wouldn't pour |
| 98.5$BeF_2$—1.5$AlF_3$ | stiff, grey | grey glass |
| 79% $BeF_2$—21$ZrF_4$ | very stiff | devitrified |
| 90$BeF_2$—10$AlF_3$ | wouldn't pour | opaque glass |
| 90$BeF_2$—10$PbF_2$ | clear, fluid | crystallized |
| 92$BeF_2$—8$PbF_2$ | clear, stiff | crystallized |
| 85$BeF_2$—15$PbF_2$ | clear, very fluid | crystallized very rapidly |
| 90$BeF_2$—5$PbF_2$—5$AlF_3$ | clear, fluid | hazy glass |

TABLE III-continued
Modified BeF$_2$ Glass Melts

| Melt Composition (mole %) | Melt Appearance | Glass Quality |
| --- | --- | --- |
| 90BeF$_2$—7AlF$_3$—3PbF$_2$ | clear, fluid | clear glass, some crystallization |
| 90BeF$_2$—10BaF$_2$ | clear, fluid | hazy glass |
| 90BeF$_2$—10LaF$_3$ | clear, fluid | devitrified |
| 90BeF$_2$—5LiF—5PbF$_2$ | clear, fluid | devitrified |
| 90BeF$_2$—10HfF$_4$ | clear, fluid | hazy glass |
| 90BeF$_2$—10GaF$_3$ | didn't melt | — |
| 90BeF$_2$—10ZnF$_2$ | clear, fluid | opal glass |
| 97BeF$_2$—3ThF$_4$ | clear, fluid | clear glass |
| 95BeF$_2$—5ThF$_4$ | clear, very fluid | clear glass |

As indicated by the data in Table III above, while some heavy metal fluorides or combinations thereof such as PbF$_2$, BaF$_2$ and the like are effective to reduce the high temperature viscosity of BeF$_2$-based melts, (e.g., the viscosity at 950° C. which is of particular interest for melting these glasses), each of these commonly used fluorides exhibits a destabilizing effect on the glass, and thus hinders the production of products of optical quality. It is only ThF$_2$ which appears capable of reducing melt viscosity without adversely affecting the stability of BeF$_2$ as a glass former. Further, these reductions in melt viscosity are obtained without major changes in other glass properties, such as refractive index, which changes are necessary consequences of using the relatively large quantities of conventional modifiers which are required to obtain stable BeF$_2$ melts of reduced viscosity. This makes the use of ThF$_2$—BeF$_2$ glasses in accordance with the invention to fabricate optical devices, and particularly devices incorporating homogeneously dispersed additions of rare earth elements such as herein described especially valuable.

The fabrication of optical devices from ThF$_4$—BeF$_2$ glasses according to the invention may be accomplished by any known method. Optical elements such as prisms or lenses may be formed by molding, with subsequent polishing to provide surfaces of optical quality. Plates for optical filters may be provided by casting, drawing, or rolling. Rod preforms for laser rods or optical fiber preforms may be formed by casting or drawing, with optical fiber formed by redrawing from the preform rod. Alternatively, optical fiber may be formed by direct drawing from crucible melts. Of course, these procedures are merely illustrative of the various known methods by which optical devices could be formed from ThF$_4$—BeF$_2$ glasses according to the invention.

I claim:

1. A glass laser rod formed of a transparent, crystal-free glass having a composition consisting essentially of 3–30% mole percent ThF$_4$, 70–97 mole percent BeF$_2$ and a rare earth dopant in an amount ranging up to about 1% by weight of the glass.

2. The glass laser rod in accordance with claim 1 wherein the ThF$_4$ content is 3–12 mole percent and the BeF$_2$ content is 88–97 mole percent.

3. A glass optical fiber comprising a transparent, crystal-free glass core having a composition consisting essentially of 3–12 mole percent ThF$_4$ and 88–97 mole percent BeF$_2$.

4. A method of making a glass optical fiber consisting predominantly of BeF$_2$ which comprises the step of:
   (a) adding a ThF$_4$ modifier to a batch for a BeF$_2$ glass in an amount effective to reduce the 950° C. viscosity of the resulting BeF$_2$—ThF$_4$ batch composition to a value below that of pure BeF$_2$;
   (b) heating the resulting BeF$_2$—ThF$_4$ batch composition to form a homogeneous molten glass;
   (c) drawing a glass rod preform for the glass optical fiber from the molten glass; and
   (d) redrawing the preform rod into a glass optical fiber.

5. A method in accordance with claim 4 wherein the molten glass consists essentially of 3–12 mole percent ThF$_4$ and 88–97% BeF$_2$.

* * * * *